Figure 1:
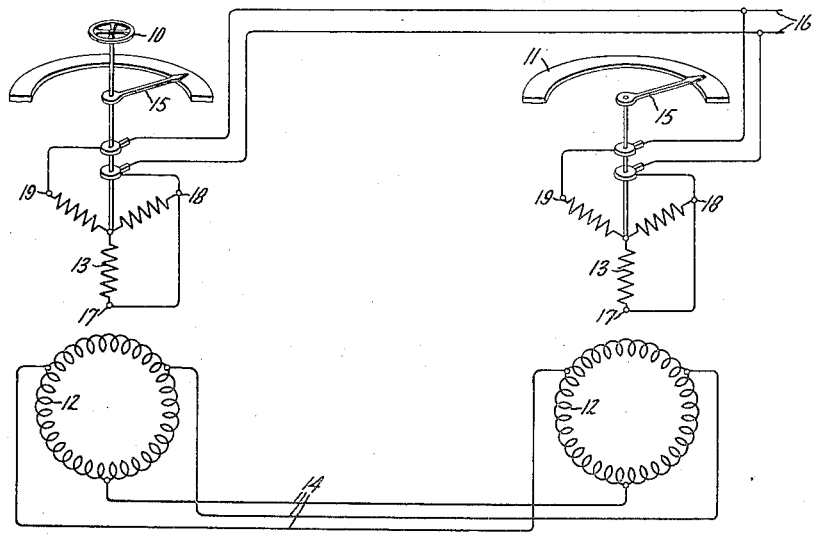

Nov. 28, 1933.  J. S. WOODWARD  1,937,375
INSTRUMENT FOR TRANSMITTING ANGULAR MOVEMENT
Filed March 30, 1933

Inventor:
James S. Woodward,
by Charles W. Mueller
His Attorney

Patented Nov. 28, 1933

1,937,375

UNITED STATES PATENT OFFICE 1,937,375

INSTRUMENT FOR TRANSMITTING ANGULAR MOVEMENT

James S. Woodward, Schenectady, N. Y., assignor to General Electric Company, a corporation of New York Application March 30, 1933. Serial No. 663,541

3 Claims. (Cl. 172—239)

My invention relates to improvements in instruments for transmitting angular movements, and has for its object improvements for increasing the torque and accuracy of such instruments. More specifically, the invention relates to self-synchronous instruments for the transmission of angular movement at a distance. Such instruments comprise a polyphase armature winding with a single phase field winding in inductive relation therewith, the two windings being relatively rotatable. In the application of such instruments to the transmission of the angular movement of an object, one of the instruments, called a generator, may be operatively connected to the object. Another instrument, called a motor, has its armature winding electrically connected to the armature winding of the first, or generator, instrument. The fields of the instrument are energized from a suitable alternating current source, and, consequently, voltages are induced in their respective armature windings. These voltages normally counterbalance. Upon movement of the object, the generator windings are relatively displaced, which causes the voltages to become unbalanced. The result is a flow of equalizing currents which exert a torque upon the rotatable element of the motor, causing it to reproduce the movement imparted to the generator.

The motor or receiver, as it may be called, has a limited amount of torque which decreases as the correct angular position is approached and is zero at the correct position in exact phase angular position with the generator. If the armature reactance in the quadrature axis of the field of the motor is large, its torque is poor, so that it becomes desirable to reduce the quadrature reactance to a minimum, and one scheme which has been proposed for reducing armature reactance in this class of instruments is explained in United States Patent No. 1,477,827, Hildebrand et. al., December 18, 1923, assigned to the same assignee as the present invention.

The scheme proposed in the said patent is applied to a salient pole field motor, and consists of independent short-circuited windings placed at right angles to the single phase armature field. The construction is somewhat expensive, and is not so effective as is desired.

In accordance with the present invention, I provide means for reducing the armature reaction of such instruments having distributed field windings, and use the distributed field winding itself for that purpose. This results in excellent torque characteristics, even with small angles of lag. The dimensions of the instrument for a given torque and accuracy may also be materially reduced. It is applicable to either motor or generator having single phase excited distributed field windings.

In carrying my invention into effect, I preferably use an ordinary Y wound three-phase distributed field winding, excite two of the leads from a single phase source, and connect the third lead to one of the excitation terminals. This provides a closed circuit in a quadrature axis with respect to the excitation axis, and gives a large ratio of magnetizing reactance to leakage reactance between the reactance of the field in the direct axis and in the quadrature axis.

Figure 2:
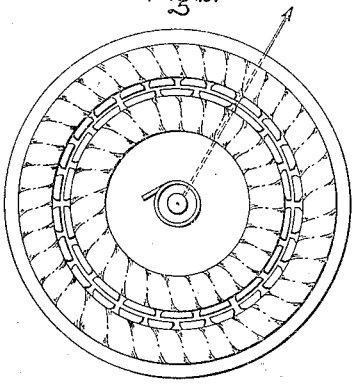
Figure 3:
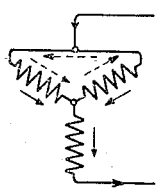
Figure 4:
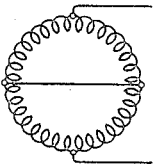
Figure 5:
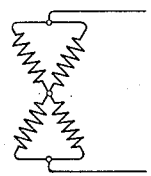

The features of my invention which are believed to be novel and patentable will be pointed out in the claims appended hereto. For a better understanding of my invention, reference is made in the follwing description to the accompanying drawing, in which Fig. 1 represents a motion transmitting system to which my invention has been applied; Fig. 2 represents an end view of one of the instruments; Fig. 3 represents the current circuits in a field winding connected in accordance with the present invention; and Figs. 4 and 5 represent other connections that may be used in distributed winding field elements.

Referring to Fig. 1, it is assumed that it is desired to reproduce the angular movement of a wheel 10 at a distant point on dial 11. At each point there are similar instruments comprising three-phase stator elements 12 and three-phase wound rotor elements 13. The stator elements are connected together in three-phase relation, either in Y or in delta, by the lines 14. The rotor elements are mounted on suitable shafts, whereby the generator or transmitter rotor may be rotated in accordance with the rotation of wheel 10, and the motor or receiver rotor may rotate a pointer 15 adjacent dial 11. The rotor fields are excited from a single phase source, represented by 16, through suitable brushes and slip rings. It will be noted that the Y wound rotors have two of the Y terminals 17 and 18 connected together to one side of the single phase source, and the other terminal 19 connected to the opposite side of the single phase source.

If the rotors have similar phase positions with respect to their stators there will be no circulating currents in the lines 14 connecting the stators, and the instruments will have zero torque. If now wheel 10 be moved to rotate the generator rotor, the stator voltages will be unbalanced and currents will flow in lines 14, producing a torque in the receiver motor, which will cause the latter to rotate to a position corresponding to that of the generator. This is the well known synchronous following action of this type of device.

In this kind of a system, a generator may supply a number of receiver motors. The positioning torque decreases as the correct position is approached.

The use of such apparatus as heretofore built has been limited. For instance, if a receiver motor is called upon to do any appreciable amount of work, such as moving a heavy control device, or if the excitation voltage is low, or if the instruments themselves are not large enough, the positioning torque may not be sufficient to reproduce accurate rotary movements. The present invention greatly increases the range of usefulness of such apparatus, by greatly increasing the positioning torque for a given size of instrument used, etc.

Referring to Fig. 3, I have here represented the star-connected exciting winding used on the instruments in connection with arrows to indicate the current circuits. The full line arrows show how the single phase exciting current flows. It will be evident that in a distributed winding this current will produce a single phase field along a given axis, as heretofore. The dotted line arrows show the path of compensating currents in the short circuit formed by the two branches of the winding which are connected to the same excitation terminal. These currents, when they flow, will greatly increase the resultant current in an axis at right angles to that of the normal exciting current, thus producing much the same effect as is intended to be produced by the short-circuited windings shown in the previously mentioned Patent No. 1,477,827. The present arrangement is, however, far more effective, because the coupling between stator and rotor is very much better, not only because the rotor winding is laid in slots close to the stator winding, but also because the entire periphery of the rotor is used. Also, the distributed winding does not occupy valuable extra space, because it is also the exciting winding of the device. A standard form of Y connected winding is used, and consequently it is of low cost as compared to the multiple winding device as heretofore proposed.

Fig. 2 represents an end view of my improved instrument showing how the distributed windings of stator and rotor are closely linked and occupy the entire air gap periphery.

Tests show that the positioning torque for a given size of instrument is increased from three to ten times by the use of this invention where the exciting winding itself automatically reduces the quadrature axis armature reactance.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other equivalent modifications.

What I claim as new and desire to secure by Letters Patent of the United States is:

1. An instrument for use in transmitting angular movement, comprising relatively rotatable inductively related windings, one winding comprising a polyphase distributed winding, and the other winding a Y-connected three-phase distributed exciting winding having two of its Y terminals connected together and connections for exciting said last mentioned winding from a single phase source.

2. An instrument for transmitting angular movement, comprising a stator member having a distributed polyphase winding thereon, a rotor member in inductive relation with the stator member and having a distributed Y-connected three-phase exciting winding thereon, means for connecting a single phase source across two of the Y terminals of said rotor member and a connection from the third Y terminal to one of said first mentioned terminals.

3. An instrument for transmitting angular movement, comprising relatively rotatable, inductively related members having distributed windings thereon, polyphase terminals for the winding on one of said members, connections for exciting the winding of the other of said members from a single phase source of supply across a given axis thereof, and means forming a short circuit in said winding on an axis in quadrature relation to the first mentioned axis to reduce the quadrature axis armature reactance of said instrument.

JAMES S. WOODWARD.